(12) United States Patent
Strachan

(10) Patent No.: US 7,450,060 B2
(45) Date of Patent: Nov. 11, 2008

(54) SIGNAL INCONSISTENCY DETECTION OF SPOOFING

(75) Inventor: Victor F. Strachan, Thousand Oaks, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/784,302

(22) Filed: Apr. 6, 2007

(65) Prior Publication Data

US 2007/0247362 A1    Oct. 25, 2007

Related U.S. Application Data

(62) Division of application No. 10/916,075, filed on Aug. 10, 2004.

(51) Int. Cl.
*G01S 5/14* (2006.01)

(52) U.S. Cl. .............................. 342/357.02; 342/357.14

(58) Field of Classification Search ....................... None
See application file for complete search history.

(56) References Cited

U.S. PATENT DOCUMENTS

| | | | |
|---|---|---|---|
| 5,557,284 A * | 9/1996 | Hartman | 342/357.03 |
| 5,583,774 A | 12/1996 | Diesel | 364/443 |
| 5,956,250 A | 9/1999 | Gudat et al. | |
| 5,995,042 A * | 11/1999 | Durboraw et al. | 342/357.02 |
| 6,417,802 B1 | 7/2002 | Diesel | 342/357.14 |
| 6,720,913 B1 | 4/2004 | Schipper | |
| 2002/0109628 A1 | 8/2002 | Diesel | 342/357.14 |
| 2007/0096977 A1 * | 5/2007 | Lillo et al. | 342/357.02 |
| 2007/0194984 A1 * | 8/2007 | Waid | 342/357.02 |

FOREIGN PATENT DOCUMENTS

JP    2001280997 A    * 10/2001

OTHER PUBLICATIONS

Dr. Young C. Lee et al., "A Performance Analysis of a Tightly Coupled GPS/Inertial System for Two Integrity Monitoring Methods," The Mitre Corporation, Center for Advanced Aviation System Development (CAASD), McLean, VA 22102, pp. 1-14.

* cited by examiner

*Primary Examiner*—Gregory C Issing

(57) ABSTRACT

Methods and apparatus relating to signal inconsistency detection of spoofing (SIDS), i.e. the use of inconsistencies in signals received at a plurality of points in space to detect spoofing.

18 Claims, 4 Drawing Sheets

COMPUTING THE VELOCITY CHANGES OF AN ANTENNA BY EVALUATING THE DYNAMICS OF A LEVER ARM BETWEEN AN INERTIAL REFERENCE SYSTEM AND THE ANTENNA

↓

COMPARING THE COMPUTED VELOCITY CHANGES TO VELOCITY CHANGES DERIVED FROM A NAVIGATION SIGNAL TO DEDUCE THE VALIDITY OF THE NAVIGATION SIGNAL

SIGNAL INCONSISTENCY DETECTION OF SPOOFING

CROSS-REFERENCE TO RELATED APPLICATIONS

The present application is a divisional application of U.S. patent application Ser. No. 10/916,075 filed on Aug. 10, 2004.

FIELD OF THE INVENTION

The present invention relates generally to positioning systems.

BACKGROUND OF THE INVENTION

Positioning systems such as the U.S. Department of Defense Global Positioning System (GPS), and the Russian GLObal'naya Navigatsionnay Sputnikovaya Sistema (GLONASS), are increasingly used in a variety of applications, both civilian and military. In such systems, one or more receivers or similar apparatus are used to interpret received signals to determine, among other things, the current position of the one or more receivers and whoever or whatever is carrying it/them.

Unfortunately, positioning systems are not immune to attempts to subvert the system by spoofing, i.e. presenting fake signals to a positioning system receiver in order to induce it to accept, as valid, false position, velocity and/or timing information. Typically, the intent of spoofing is to deflect, surreptitiously, a dynamic platform (sometimes hereinafter "victim") from its intended course to some other course at the discretion of the spoofing agent (sometimes hereinafter "spoofer"). The term "navigation signals" will sometimes be used herein to describe signals broadcast by a navigation system in a form for, and for the purpose of, providing at least one receiver such as a radio navigation receiver with information useful for determining the location of an antenna or antenna element of the receiver.

Let $\vec{a}$ be the vector characterizing the location $(x_a, y_a, z_a)$ of the antenna, or antenna element, a, component of a radio navigation receiver. Let $\vec{u}^m$ be the unit line of sight (LOS) vector from a to the radio transmitter, $r^m$, of a radio navigation signal, $n^m$. The location, $\vec{r}^m$, of each $r^m$ is known either because it is stored in a database or because it is transmitted by with the navigation signal or some combination of both.

Let the scalar, $\Phi^m$ be a measurement of the value of the signal $n^m$, as observed at a. The value of the signal is a quantization of the navigation information carried by the signal, the information might be range, pseudo-range, phase or timing information; all of which can effectively be scaled into the basic spatial units of the coordinate frame x, y, z. The contribution of this measurement, $\Phi^m$, to the navigation estimate of the location of a is characterized by equation $\vec{a} = \vec{r}^m - \Phi^m \vec{u}^m$. This equation reduces to $\Phi^m = \| \vec{r}^m - \vec{a} \|$ (Equation 1). If the measurement is phase then it will contain an unknown number of whole cycles plus a part cycle i.e. $\Phi^m = 2\pi I + \Phi^m$ where I is an integer. An adequate set of measurements from n transmitters enables resolution of the location of a.

The spoofer substitutes misleading or spoofing signals, $s^m$, for some, or all, of the legitimate navigation signals, $n^m$, with the objective of corrupting the navigation system's estimate of position in such a fashion that the corruption is not detected by the navigation system.

It is assumed that the navigation system has some estimate, $\hat{\vec{a}}$, of its location and can thus form an a priori estimate of $\Phi^m = \| \vec{r}^m - \hat{\vec{a}} \|$. In order for the misleading measurement, $<\Phi>^m$, generated by the spoofer to be believable the following condition must be true, $|\hat{\Phi}_-^m - <\Phi>^m| < \partial^m$ (Equation 2), where $\partial^m$ is a threshold which takes into account the statistics of the possible error in the a priori estimate $\hat{\Phi}^m$ and the statistics of the measurement noise and the desired level of certainty in the veracity of the measurement. In addition to passing the threshold condition of Equation 2 there is another hurdle for the spoofer to overcome. The set of measurements of Equation 1 from n transmitters must be self-consistent. Let $\hat{\Phi}_+^m$ be the post facto estimate (after the navigation solution incorporating $<\Phi>^m$ has been formed). In order for the set of n measurements to be deemed self-consistent the following condition must be met, $\Sigma_{m=1}^n (\hat{\Phi}_+^m - <\Phi>^m)^2 < \Delta_n^2$ (Equation 3), where the threshold, $\Delta_n^2$, is calculated in a similar statistical fashion to the threshold in Equation 2. By accurately tracking the vehicle being spoofed, by carefully simulating the navigation signals, and by controlling the rate at which the misleading information diverges from the true information to ensure compliance with the conditions of Equation 2 and Equation 3, a spoofer may succeed even if all the spoofing signals are broadcast from a single location. The tests of Equations 2 and 3 above, or similar procedures, are applied as standard practice to test measurements incorporated in a navigation solution in order to avoid incorporating faulty measurements.

As the possibility of a spoofer succeeding exists using previously known methods and apparatus, there is a need for methods and apparatus for preventing spoofing of positioning system receivers, in particular satellite positioning system receivers such as GPS and GLONASS receivers.

Additional information on positioning systems and the techniques they use can be obtained by reference to at least the following publications, each of which is incorporated in its entirety by reference herein:

(1) *Global Positioning System: Signals, Measurements and Performance*, Pratap Misra, et al., ISBN: 0970954409.
(2) *GPS Bluebook*, The Institute of Navigation
(3) *Monographs of the Global Positioning System* ("GPS Red Books"), The Institute of Navigation.
(4) Institute of Navigation Proceedings of the National Technical Meeting 2003, *Precise Velocity Estimation Using a Stand-Alone GPS Receiver*, F. van Graas, A. Soloviev, NTM 03.
(5) U.S. Pat. No. 5,583,774, *Assured-Integrity Monitored-Extrapolation Navigation Apparatus*, Dec. 10, 1996.
(6) U.S. Pat. No. 6,417,802, *Integrated Inertial/GPS Navigation System*, Jul. 9, 2002.

SUMMARY OF THE INVENTION

Embodiments of the present invention comprise methods and apparatus relating to signal inconsistency detection of spoofing (SIDS), i.e. the use of inconsistencies in signals received at a plurality of points in space to detect spoofing.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION

In addition to applying standard tests, SIDS (Signal Inconsistency Detection of Spoofing) is designed to exploit the fact that when the spoofing signals don't radiate down the expected LOS and are observed from more than one point in space the associated measurements will of necessity be inconsistent.

Let a pair of antennae, or antenna elements, ($a_i$, $a_j$) be represented by the vector $\vec{a}_{ij}$. Let $\vec{u}_{ij_c}^m$ be the unit line of sight vector from, $\vec{a}_{ij_c}$, the center of the antennae pair ($a_i$, $a_j$) to the location of the transmitter, $\vec{r}^m$, of a radio navigation signal, $n^m$.

Consider the scalar, $\Phi_{ij}^m$ to be the difference between the measurement at made $\vec{a}_i$ of the information carried by $n^m$ and the measurement made at $\vec{a}_j$. (If the particular information is phase then $\Phi_{ij}^m$ is the phase difference between the two antennae i.e. $\Phi_i^m - \Phi_j^m$.) Measurements of this type can be generalized by the equation $\Phi_{ij}^m = \vec{a}_{ij} \cdot \vec{u}_{ij_c}^m$ (Equation 4), where each unique combination of indices (i,j,m) represents a single observation.

Figure 1:
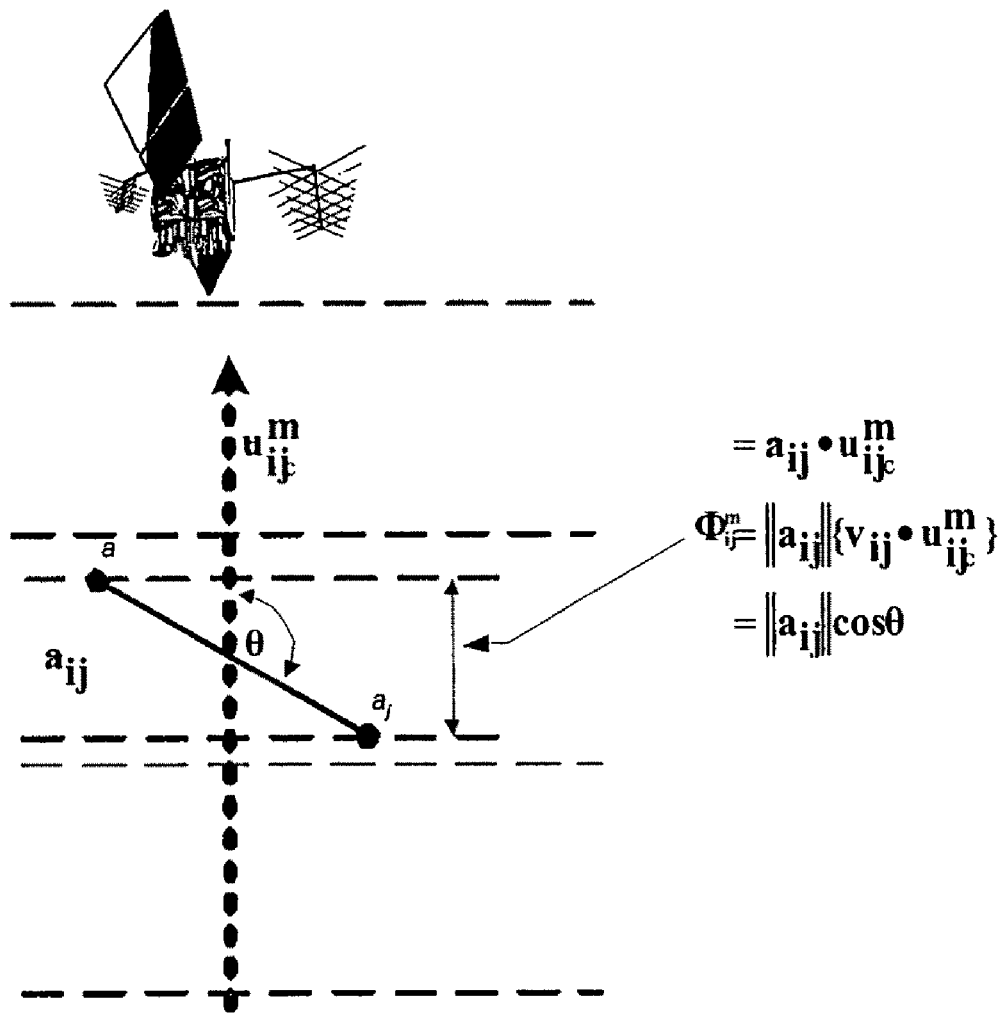
FIG. 1 illustrates a situation wherein a vehicle comprises a single antenna pair and a single navigation source and spoofing is not occurring.

The normal (un-spoofed) situation for a single antenna pair and a single navigation source is illustrated in FIG. 1. The figure is annotated "phase" but the measurement could be in the range, pseudo-range, phase or timing domain. The first order approximation using a unit vector to the center of the antenna pair is valid provided the range to the radio navigation source is much greater than the antenna separation. The alternative method is to use unit vectors from each of the antennae to the radio navigation source.

The equations on the right hand side of FIG. 1 are derived from Equation 4 above. It should be noted that the measurement units on both sides must be consistent. If the measurement, $\Phi$, is range or pseudo-range then there is no issue. If the measurement is timing or phase then one side or other of each equation needs to be appropriately scaled.

Figure 2:
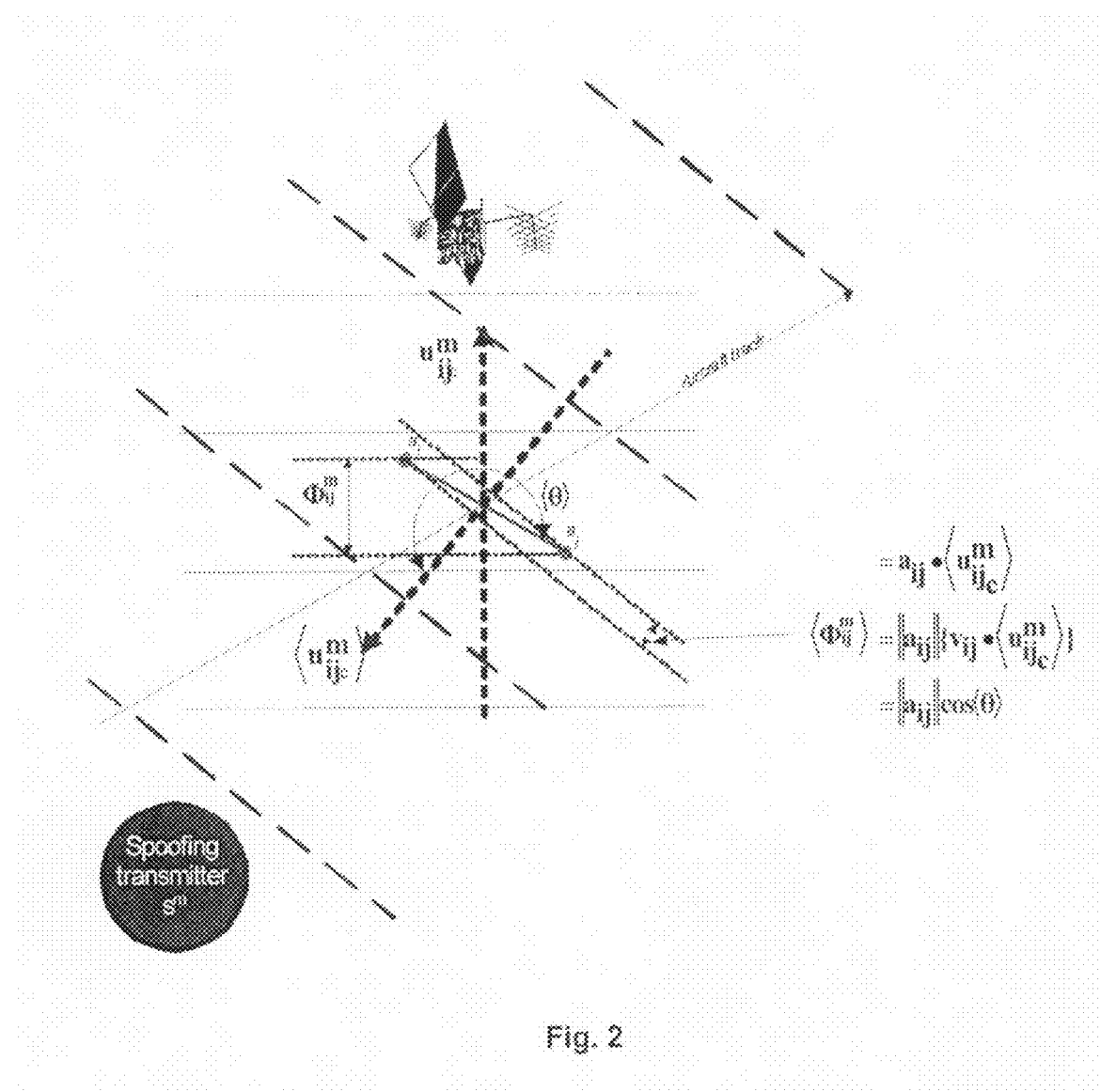
FIG. 2 illustrates a situation wherein a vehicle comprises a single antenna pair and a single navigation source and spoofing is occurring.

FIG. 2 superimposes the spoofing case on FIG. 1. The symbology <•> is used to indicate measurements from a spoofing signal. FIG. 2 also indicates a situation in which the spoofing wavelength and the navigation signal are different. This wavelength divergence occurs when the spoofer adjusts the spoofing signal frequency so that as the aircraft travels down track it sees the same rate of phase change from the spoofing signal as it would see from the true navigation signal.

Concurrent SIDS

The method of Concurrent SIDS is to examine suites of such concurrent observations as characterized by Equation 4 and illustrated in FIG. 2 for consistency. Concurrent SIDS requires there to be at least one physical antenna pair so that observations can be made concurrently at two points in space. In this context, the term, concurrent, should be taken to mean that the any asynchrony between measurements is either compensated for within the process, or, if uncompensated, has no significant effect on the overall outcome of the process—the exact range of acceptable asynchrony is implementation specific. To further amplify this point consider a situation in which (a) the receiving and transmitting antennae have zero relative velocity (b) the frequency of the transmitter is perfectly stable and known and (c) the time at which each measurement was made was known and (d) there were no other temporal error sources. In this circumstance, phase difference measurements made many seconds apart could be considered concurrent—since it would be possible to convert the time difference back into change of phase and hence remove its effect. Apart from setting an appropriate false alarm rate, the probability of detecting a spoofing signal depends upon the effectiveness of SIDS.

The effectiveness of SIDS depends on the following: (a) the angle between the LOS to the true source and the LOS to the spoofing source i.e. $\theta - <\theta>$; (b) the noise in the measurement of $\Phi_{ij}^m$; (c) the uncertainty in the estimate of each $\vec{a}_{ij}$; and (d) the uncertainty in the knowledge of $\vec{r}^m$ (because the estimate of $\vec{u}_{ij_c}^m$ is derived from $\vec{a}_{ij_c}$ and $\vec{r}^m$.)

Since $r^m$ is a navigation source it is assumed that its location is known to within the accuracy necessary to navigate with the required performance. Further since $\Phi_{ij}^m$ is a navigation signal it is assumed that the noise in the signal is appropriate for the navigation task. Lastly, it is assumed that the signal characteristics necessary to use the signal for navigation are also known, e.g. in the case that phase measurements are used it is assumed that characteristics such as frequency and modulation are known.

Thus the most significant variables in determining the effectiveness of SIDS are the LOS difference and the uncertainty in the estimate of $\vec{a}_{ij}$, where $\vec{a}_{ij}$ can be considered as having three components: (1) Magnitude $\|\vec{a}_{ij}\|$ (which is assumed to be known); (2) Direction specified by the unit vector $\vec{v}_{ij} = \vec{a}_{ij}/\|\vec{a}_{ij}\|$; and (3) Location as specified by $\vec{a}_{ij_c}$.

If all three components of $\vec{a}_{ij}$ are known (or are reasonably estimated) then an estimate $\hat{\Phi}_{ij}^m$ of $\Phi_{ij}^m$ can be formed where $\hat{\Phi}_{ij}^m = \|\vec{a}_{ij}\| \{\vec{v}_{ij} \cdot \vec{u}_{ij_c}^m\} = \|\vec{a}_{ij}\| \cos \theta$ (Equation 5).

For each orthogonal element of the components of $\vec{a}_{ij}$ that is not known a further independent measurement is required. This measurement might be achieved by using another (ideally orthogonal) antenna pair or another navigation source. Independent redundant measurements increase the effectiveness of the process by reducing the effect of noise on the observations. Time series of sets of concurrent measurements may also be used to reduce the effects of noise.

The decision as to whether some or all of the observations are being spoofed is achieved by reviewing the residuals in the manner of Equation 2.

There is a complication in the case measurements are made in the phase domain. Depending on the magnitude, $\|\vec{a}_{ij}\|$, of the antenna baseline versus the wavelength of the carrier there may be multiple values of $<\theta>$ such that $\hat{\Phi}_{ij}^m = \|\vec{a}_{ij}\| \cos<\theta>$ i.e. a spoofing measurement is indistinguishable from a true measurement. Measurements form other navigation sources may reveal that spoofing is in process but will not specifically resolve the issue for the current ambiguity. Use of another antenna pair will in all probability resolve the issue for the ambiguity in question.

The third alternative is to wait for, or cause, the geometry to change. As the geometry changes so the inconsistency will rapidly become observable—the more angular ambiguities, the more sensitive the system is to inconsistency growth.

Once inconsistency has been established then the measurements can be used to establish the value of <θ> that minimizes the residuals (or is the unique solution in case of a suite of measurement equations that is not over determined. <θ> provides a bearing to the spoofing transmitter, rate of change of <θ> can be used to deduce a range.

Consecutive SIDS

Consecutive SIDS exploits the same basic principle as Concurrent SIDS: i.e. the fact that an antenna pair will observe inconsistency in the suite of measurements characterized by Equation 4 if the LOS to the spoofer and the line of sight to the true source are not collinear. Concurrent SIDS is based on the difference, $\Phi_{ij}^m$, between contemporaneous measurements at two antennae or antenna elements. Consecutive SIDS is based on the difference, $\Phi_{t_i,i+1}^m$ between sequential measurements, made at time $t_i$ and time $t_{i+1}$, at the same antenna, the position of which will have changed between the two measurements. This pair of antenna positions is denoted $\vec{a}_{t_i,i+1}$.

Consecutive SIDS requires that the relative position changes of the antenna be tracked by a system independent of the radio navigation source(s) being checked for spoofing. This tracking is most effectively accomplished by using an inertial reference system (IRS) that has either calibrated the lever arm between itself and the antenna or has been provided with a priori knowledge of the lever arm. In some instances, navigation signals are used to calibrate and update the inertial reference system in a valid manner, such as that exemplified by Northrop Grumman's AIME filter, as described in U.S. Pat. No. 5,583,774.

The decision methodology for Consecutive SIDS is similar to that for Concurrent SIDS except that the comparison is between $\Phi_{t_i,i+1}^m$ and $\hat{\Phi}_{t_i,i+1}^m$ where $\hat{\Phi}_{t_i,i+1}^m$ is based upon the inertial estimate of the relative change of position of the antenna. In the case of Consecutive SIDS it is possible with reasonably accurate a priori knowledge of $\vec{a}_{t_i,i+1}$ to check for spoofing signal by signal. The efficiency of detection is improved, and the effect of deficiencies in a priori knowledge of $\vec{a}_{t_i,i+1}$ reduced, if the spoofer is radiating more than one spoofed signal from the same location. The antenna tracking error will be common to all spoofed signals from the same location and will provide a correlated error that may be identified in an hypothesis testing Kalman Filter such as e.g. an appropriately mechanized version of Northrop Grumman's patented AIME™ filter, as described in U.S. Pat. No. 5,583,774. In this mechanization the nature of the inconsistencies will correlate to the actual angle of arrival of the spoofing signal and hence an estimate of the bearing of the spoofer will be available. The rate at which this bearing changes will provide an estimate of the range to the spoofer.

If the spoofer is able to track the antenna perfectly and emulate the signal that would have been emitted by the true (with believable spoofing progressively introduced) then he will remain undetected. The probability of correctly identifying the presence of spoofing, apart from the usual signal to noise considerations, increases as: (a) the dynamics of the antenna increase, at least in part because it is harder for the spoofer to track and emulate; (b) the interval between observations decrease, at least in part because it increases the accuracy demand on the spoofer; (c) the length of the time series of observations increases, at least in part because it reduces the effect of noise; (d) the accuracy of the independent antenna positioning system (e.g. IRS) increases, at least in part because it increases the accuracy demand on the spoofer; (e) the error in the estimate of lever arm decreases, at least in part because it increases the accuracy demand on the spoofer; (f) a function of the angle between the true LOS and the LOS to the spoofer; and (g) the number of spoofed signals radiated from the same location increases If the time interval between observations is sufficiently short then Concurrent SIDS may be considered to operate in the velocity domain as opposed to the relative position domain and such techniques as described in Reference 1 may be applied to the problem when the navigation sources in question are radio navigation satellites (e.g. GPS).

Differences between Concurrent and Consecutive SIDS

Consecutive SIDS Differs from Concurrent SIDS in the Following:

(a) Consecutive SIDS does not require a physical antenna pair but can be used even if only a single antenna is available.

(b) Concurrent SIDS can defeat the perfect spoofing signal because the only way that the spoofer can deliver a consistent signal to separate antennae is to transmit down the LOS to the true source (which is impractical). Consecutive SIDS depends upon the spoofer not being perfect; it relies on the inability of the spoofer to precisely track the electronic center of the antenna.

(c) Concurrent SIDS uses concurrently formed differences between antennae. Consecutive SIDS forms differences between measurements at the same antenna separated by time. Both Concurrent and Consecutive SIDS may also use a time series of such measurements to reduce the effects of noise.

(d) Concurrent SIDS does not require antenna motion; Consecutive SIDS is based on detection of the errors in spoofing caused by antenna motion.

(e) In Concurrent SIDS the orientation of the antenna pair could be an unknown resolved by making more observations. Consecutive SIDS is based on a priori knowledge of the relative position of a single antenna at, at least, two instants in time.

Characterizations of Sample Embodiments

The embodiments of the invention described herein comprise multiple novel features with each described embodiment including either a single such feature or a combination of such features. In addition to such described combinations, other contemplated embodiments include all combinations of one or more such novel features not explicitly described herein as such combinations are readily discernable from the embodiments described. The present invention can be characterized in a number of ways with the following paragraphs providing examples of some such characterizations.

Figure 3:
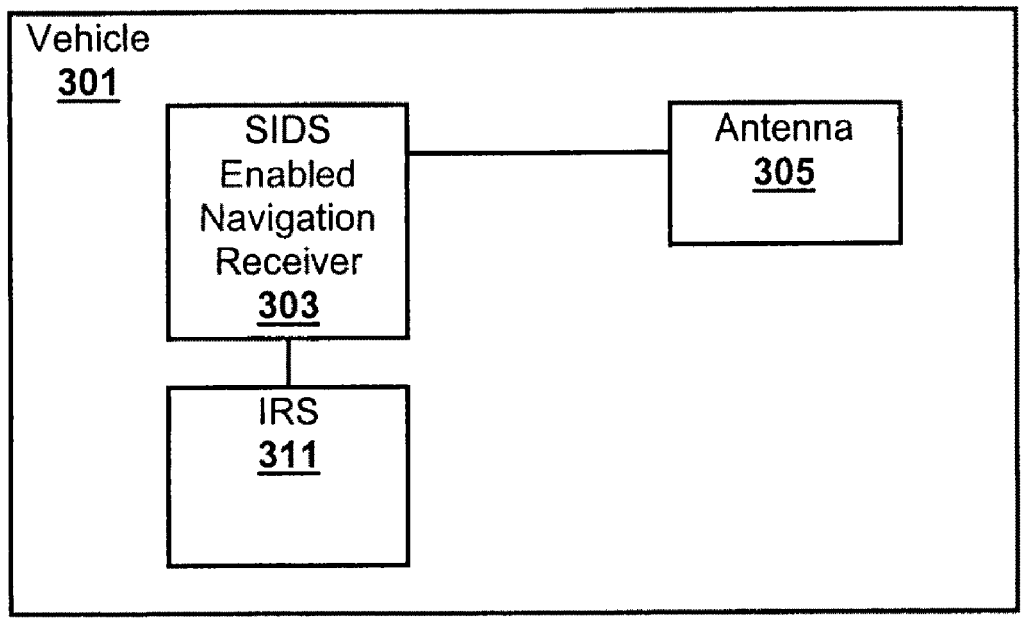
FIG. 3 is a block diagram of an apparatus in accordance with an embodiment of the invention.
Figure 4:
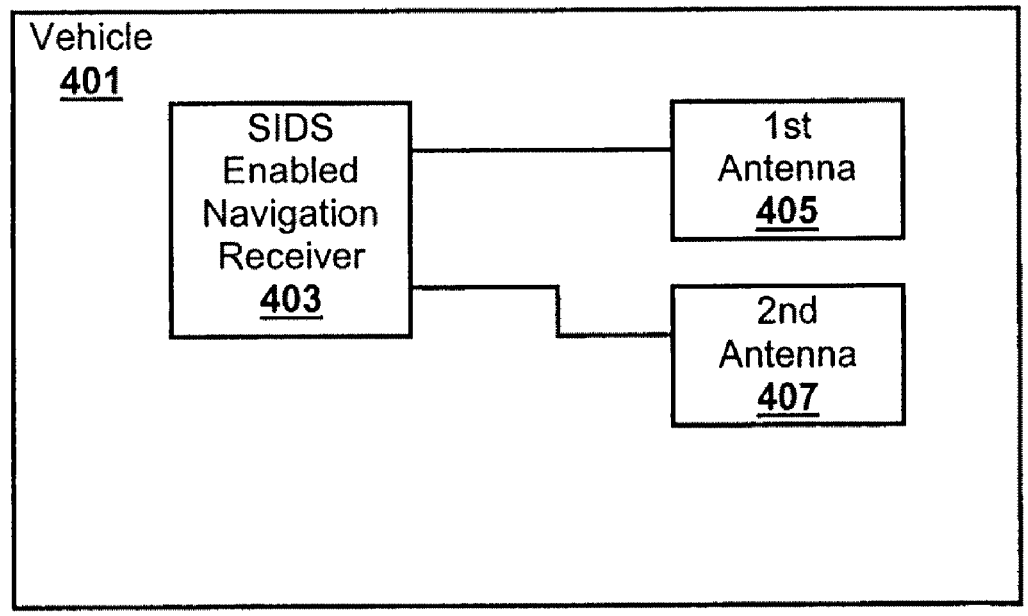
FIG. 4 is a block diagram of an apparatus in accordance with an embodiment of the invention.

Some embodiments of the present invention may in some instances each be characterized as an apparatus that utilizes inconsistencies in signals received at a plurality of points in space to detect spoofing. In some such instances, the apparatus may also be, referring to FIG. 3, characterized as a vehicle 301 comprising a satellite navigation receiver 303, at least one antenna or antenna element 305 electrically coupled to the receiver 303, and at least one inertial reference system 311, and the vehicle 301 is adapted to utilize the inertial reference system 311 to track changes in position of the at least one antenna or antenna element 305. In other such instances, the apparatus may also be, referring to FIG. 4, characterized as a vehicle 401 comprising a satellite navigation receiver 403, and at least two antennae or antenna elements 405 and 407 electrically coupled to the receiver 403.

Figure 5:
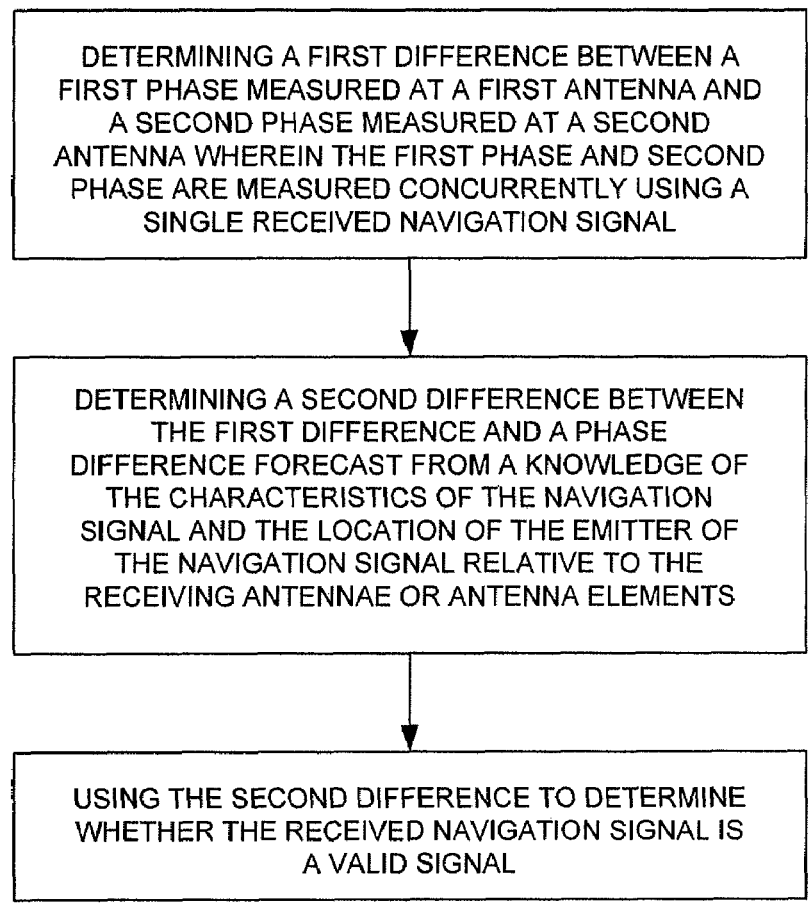
FIG. 5 is a flowchart of a method in accordance with an embodiment of the invention.
Figure 6:
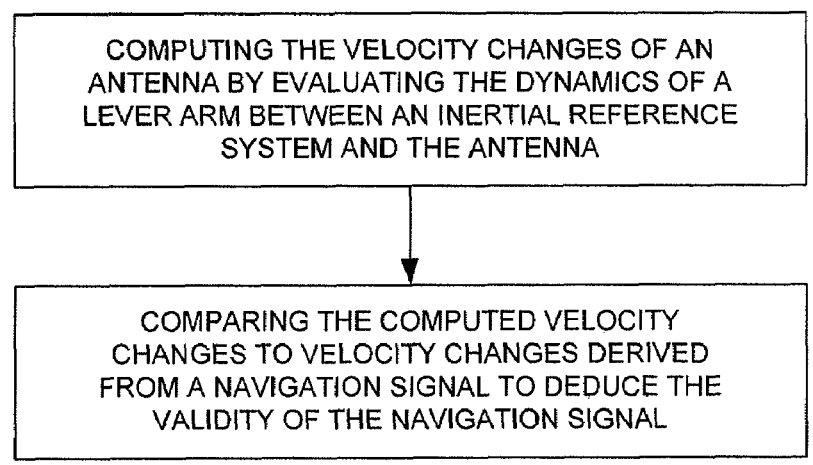
FIG. 6 is a flowchart of a method in accordance with an embodiment of the invention.

Some embodiments of the present invention may in some instances each be characterized as a method of detecting spoofing using one or more radio receivers and at least two antennae or antenna elements comprising, as illustrated in FIG. 5, step 501, determining a first difference between a first phase measured at a first antenna and a second phase measured at a second antenna wherein the first phase and second phase are measured concurrently using a single received navigation signal; step 503, determining a second difference between the first difference and a phase difference forecast from a knowledge of the characteristics of the navigation signal and the location of the emitter of the navigation signal relative to the receiving antennae or antenna elements; and step 505, using the second difference to determine whether the received navigation signal is a valid signal.

Some embodiments of the present invention may in some instances each be characterized as a method of detecting spoofing using one or more radio receivers, at least one antenna or antenna element, and an inertial reference system, comprising: step 601, computing the velocity changes of an antenna by evaluating the dynamics of a lever arm between an inertial reference system and the antenna; and step 603, comparing the computed velocity changes to velocity changes derived from a navigation signal to deduce the validity of the navigation signal.

Summary

SIDS is designed to detect the presence of spoofing by detecting inconsistencies in the signal geometry caused by the fact that the spoofer either cannot simultaneously provide a consistent signal at two antenna locations or cannot track the electronic center of an antenna on a dynamic vehicle with sufficient accuracy that the spatial inconsistencies pass undetected.

SIDS has Three Modes for Detecting Spoofing:

(1) The standard threshold test mode, comparing the a priori and post facto estimates of the signal value(s) with the measured signal value(s) as previously described.

(2) The Concurrent mode, in which estimates of the relative differences in signal values between a pair of antennae or antenna elements are compared against a statistically appropriate decision threshold. Depending on the state of knowledge of the navigation system, a decision may require one or more independent concurrent measurements. A time series of measurement sets, each set consisting of concurrent measurements made on one or more navigation signal and/or by one or more antenna pair, may be used to reduce noise and increase the probability of detection while maintaining a desirable maximum false alarm rate.

(3) The Consecutive mode, in which estimates of the relative difference in signal values observed sequentially by a single antenna at two space time points are compared with the relative difference estimated by an independent source such as IRS. A time series of measurement sets, each set consisting of consecutive measurements made on one or more navigation signals concurrently, may be used to reduce noise and increase the probability of detection while maintaining a desirable maximum false alarm rate.

As part of the detection process both Concurrent and Consecutive SIDS are able to estimate the bearing from which the spoofing signal emanates and by estimating the rate at which the bearing changes are able to estimate the range to the spoofer.

SIDS may operate in any combination of these three modes simultaneously as the available antenna configuration allows.

What is claimed is:

1. A method of detecting whether a navigation signal is a spoofing signal using one or more radio receiver, at least one antenna, and an inertial reference system, the method comprising:
    computing velocity changes of the at least one antenna using the inertial reference system;
    deriving velocity changes of the at least one antenna using the navigation signal;
    calculating a difference between the computed velocity changes and the derived velocity changes; and
    comparing the difference to a predetermined threshold to determine whether the received signal is a spoofing signal.

2. The method of claim 1 wherein the inertial reference system computes the velocity changes of the at least one antenna by evaluating dynamics of a lever arm coupled between the inertial reference system and the at least one antenna.

3. The method of claim 1 wherein the velocity changes of the at least one antenna are based on a priori knowledge of lever arm dynamics.

4. The method of claim 1 further comprising calibrating the inertial reference system only if the comparing step yields a value less than the predetermined threshold.

5. The method of claim 4 wherein the computing step relies on a priori knowledge of position of the at least one antenna, and wherein the predetermined threshold is based on statistical error in the a priori knowledge.

6. The method of claim 4 wherein the predetermined threshold is based on a desired level of certainty.

7. The method of claim 4 wherein the calibrating step comprises updating current position data of the inertial reference system only if the comparing step yields a value less than the predetermined threshold.

8. The method of claim 1 wherein the computing step relies on a priori knowledge of position of the at least one antenna.

9. A method of validating a navigation signal using a radio receiver having an antenna and an inertial reference system capable of tracking position changes of the antenna, the method comprising:
    obtaining a first navigation measurement from a navigation signal with the antenna in a first position;
    obtaining a second navigation measurement from the navigation signal with the antenna in a second position;
    calculating a difference between the first and second measurements;
    estimating a relative difference between the first navigation measurement and the second navigation measurement using the inertial reference system;
    comparing the estimated difference to the calculated difference; and
    determining validity of the navigation signal based on the comparison.

10. The method of claim 9 wherein the estimating step comprises the inertial reference system estimating a change in position of the antenna based on antenna velocity.

11. The method of claim 10 wherein the inertial reference system derives the antenna velocity by evaluating dynamics of a lever arm coupled between the inertial reference system and the antenna.

12. The method of claim 9 wherein the estimating step comprises estimating a change in position of the antenna based on a prior knowledge of antenna dynamics.

13. The method of claim 9 wherein the estimating step relies on a priori knowledge of position of the antenna.

14. The method of claim 9 further comprising determining the navigation signal as valid if a result of the comparing step yields a value less than a predetermined threshold.

15. The method of claim 14 further comprising calibrating the inertial reference system if the navigation signal is valid.

16. The method of claim 15 wherein the calibrating step comprises updating current position data of the inertial reference system if the navigation signal is valid.

17. The method of claim 14 wherein the estimating step relies on a priori knowledge of position of the antenna, and wherein the predetermined threshold is based on statistical error in the a priori knowledge.

18. The method of claim 14 wherein the predetermined threshold is based on a desired level of certainty.

* * * * *